United States Patent [19]

Casey et al.

[11] 4,291,091

[45] Sep. 22, 1981

[54] BUBBLE MEMORY OPTIMIZATION BY ADJUSTING PROPERTIES OF QUARTZ FILM

[75] Inventors: Martin J. Casey, Lansdale; Barry F. Stein, Dresher; Herman E. Wetterskog, Douglasville, all of Pa.

[73] Assignee: Sperry Corporation, New York, N.Y.

[21] Appl. No.: 158,194

[22] Filed: Jun. 11, 1980

Related U.S. Application Data

[62] Division of Ser. No. 839,699, Oct. 5, 1977.

[51] Int. Cl.$^3$ .............................................. B32B 9/04

[52] U.S. Cl. .............................. 428/336; 204/192 D; 428/433; 428/448; 428/450; 428/457; 428/692; 428/697; 428/702; 428/900

[58] Field of Search ....................... 427/127, 131, 132; 428/900, 433, 539, 448, 336, 450, 458, 457, 692, 697, 702; 204/192 D

[56] References Cited

U.S. PATENT DOCUMENTS 4,172,758 10/1979 Bailey et al. .................... 427/131 X

*Primary Examiner*—Bernard D. Pianalto

*Attorney, Agent, or Firm*—Rene A. Kuypers

[57] ABSTRACT

A bubble memory device and method of fabrication are disclosed which establish that there is a correlation between bubble memory performance and the properties of a quartz film, which is interposed between the bubble film and metallic overlays, namely, the permalloy and/or conductor layers of the device. Specifically, it has been established that there is a correlation between improved device performance and a low p-etch rate which is a measurement that establishes certain elastic constants of the quartz (i.e., the response of the device to stress).

4 Claims, 3 Drawing Figures

BUBBLE MEMORY OPTIMIZATION BY ADJUSTING PROPERTIES OF QUARTZ FILM

This is a division of application Ser. No. 839,699, filed Oct. 5, 1977.

SUMMARY OF THE INVENTION

It has been found that in magnetic bubble memory devices there is an interplay between the quartz layer, which had previously been thought by those skilled in the art to be functionally passive, and the bubble and metallic overlays. In other words, a correlation has been found between the quality of the glass or quartz layer and bubble memory performance.

The quality of deposited glass may be determined by its p-etch rate, and it has been determined that a low p-etch rate gives good bubble memory device performance whereas a high p-etch rate gives poor device performance.

It has also been determined by this invention that the low p-etch rate may be controlled by the deposition temperature of the quartz. Therefore, temperature changes during fabrication affect the characteristics of the glass which in turn affect the performance of the bubble memory device.

In particular, good bubble memory device performance of the present invention has resulted in improved margins of performance which can be fabricated in a reproducible fashion. Also, bubble pinning (i.e., inability of a bubble to propagate) has been eliminated or minimized in accordance with the teachings discussed in this invention. Furthermore, the operating range of the bubble device is increased in accordance with the teachings of this invention.

It is therefore an object of this invention to develop a new and improved bubble memory device in accordance with the teachings by a new and improved method of quartz deposition.

BACKGROUND OF THE INVENTION

1. Field of the Invention

This invention pertains to the field of magnetic bubble memory devices using a quartz film spacer having particular elastic properties and to the method of fabricating such quartz films to insure proper device behavior.

2. Description of the Prior Art

It has recently been discovered that there is an adverse interaction between magnetic bubble domains with the overlying patterned metallizations such that local stress fields under the edges of the metal overlay patterns can cause the bubbles to collapse or pin. The Journal of Applied Physics, V45, No. 9, 4076, September 1974, authored by Dishman, Pierce and Roman, has discussed this problem in some detail and the authors have found that the use of a spacer layer reduces the stress in the magnetic material thereby permitting improved bubble performance. However, in the above article no consideration was given to the properties or in the method of controlling these properties in the quartz layer. Furthermore, there was no consideration given as to how the various properties of the quartz layers would degenerate or improve bubble device performance.

DESCRIPTION OF THE PREFERRED EMBODIMENT

Figure 1:
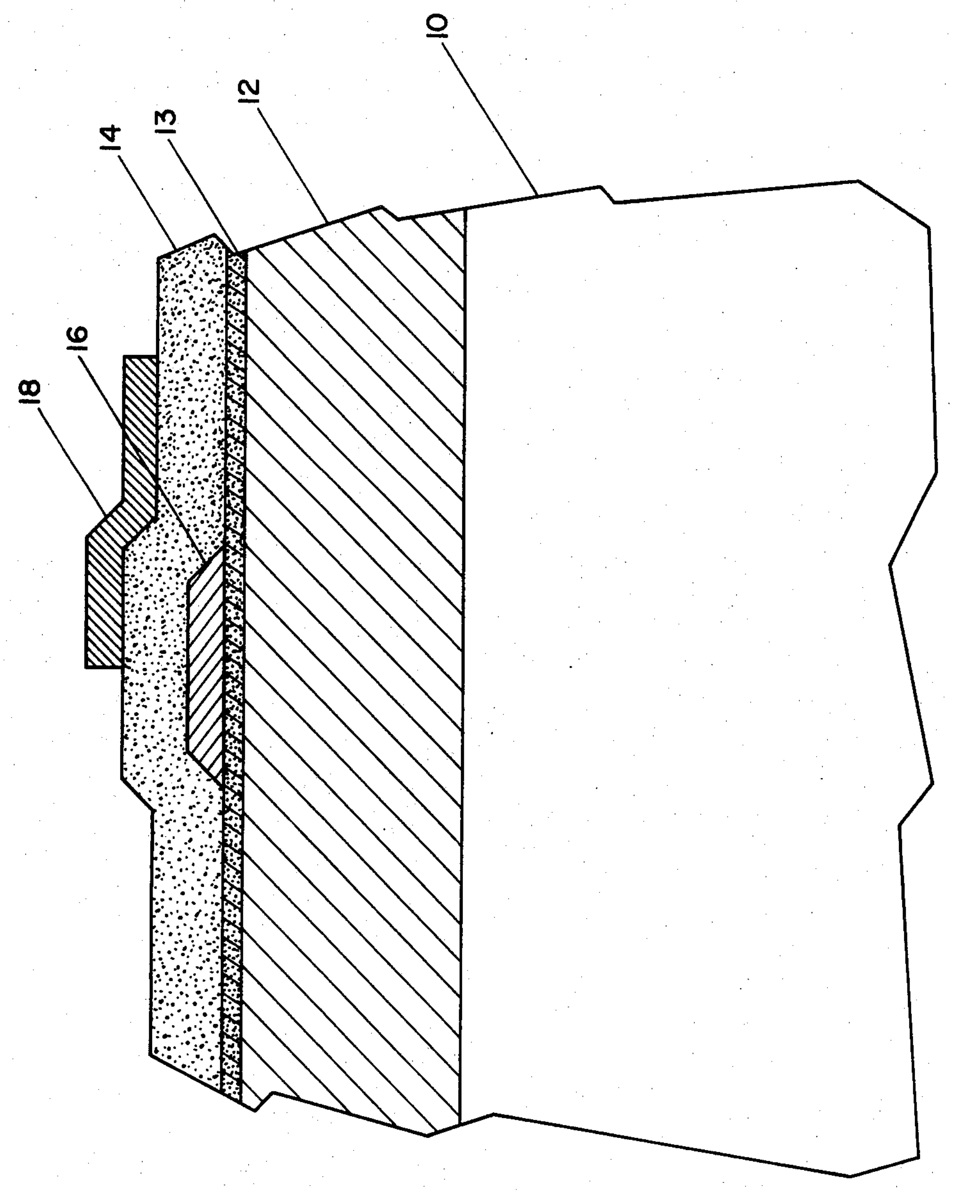
FIG. 1 is a cross-sectional view of a bubble memory device utilizing a quartz spacer.

Referring now to FIG. 1, there is depicted a sectional view of a typical bubble memory device wherein a liquid phase epitaxially (LPE) grown garnet film 12, which is 2-6 $\mu$ thick wherein wall domains may be moved, is deposited on a non-magnetic gadolinium gallium garnet substrate 10 having a thickness of 10-20 mils. Positioned upon the LPE film 12 is a quartz or $SiO_2$ film 13 which is deposited by R. F. sputtering. Located on the quartz film 13 is a conductor film 16 made of aluminum and 2% copper. The aluminum-copper conductor is utilized to manipulate bubble movement throughout the memory device together with a rotating magnetic field.

A second quartz film 14 is R. F. sputtered upon the conductor 16, and thence a Permalloy film 18 is deposited by evaporation techniques thereon which is then formed into a bubble propagation circuit by etching. It has been observed in accordance with this invention that the properties of the quartz spacer 13, 14 between the bubble film 12 and the metal overlay patterns 16 and 18 have a dramatic influence on the operating margins of the bubble device. In particular, it has been determined that by increasing the quartz's stiffness (i.e., decreasing deformation per unit of strain), bubble pinning or bubble collapse has decreased. The method for obtaining improved bubble operating margins will now be discussed.

Figure 2:
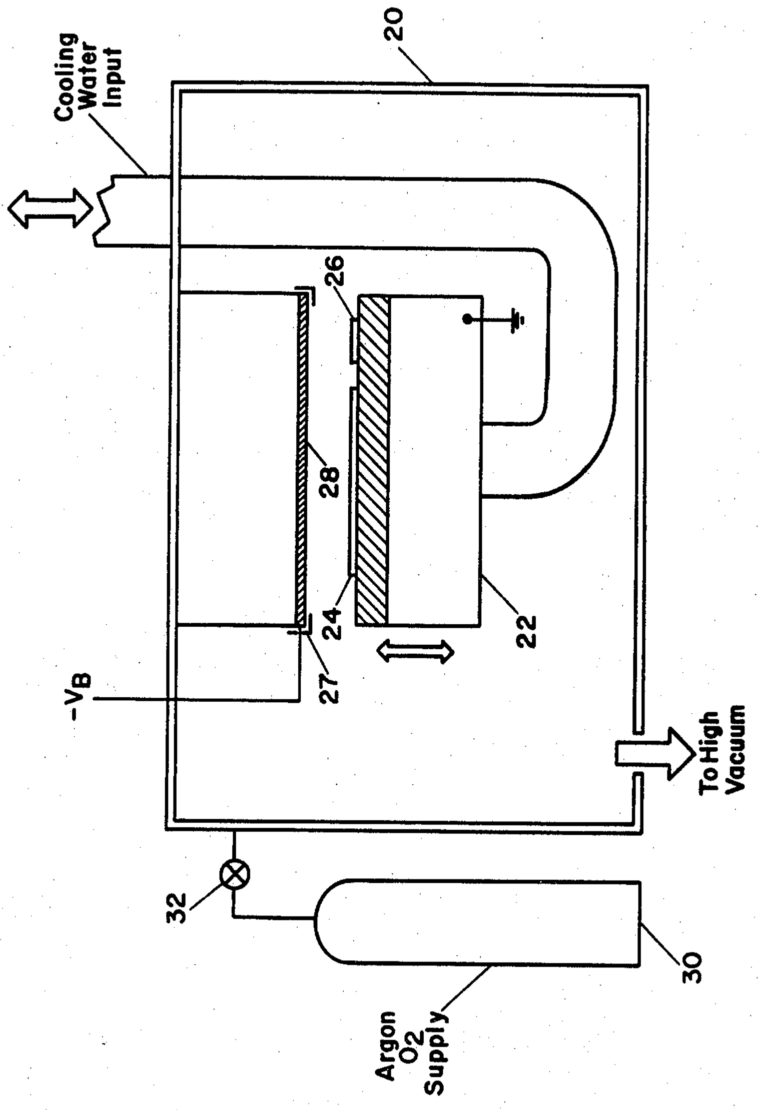
FIG. 2 is the R. F. sputtering apparatus utilized to deposit the quartz layers in the apparatus of FIG. 1.

FIG. 2 in schematic form depicts a vacuum deposition chamber 20 wherein R. F. sputtering takes place. The chamber 20 is one wherein air has been evacuated to approximately $10^{-6}$ Torr and a gas mixture of 90% Argon and 10% oxygen has been substituted therefor from the supply 30 through the valve 32. The Argon-Oxygen sputter gas is established in the chamber 20 at a pressure of 10 microns.

Within the chamber 20 there is located a substrate table 22 which is adjustable in height as indicated by the arrow. The cross-hatched portion of the table is made of copper and acts as the anode of the R. F. sputtering system and is water cooled by conventional circulating water means. The substrate table 22 or the anode are maintained at d.c. ground potential, and at a substrate table temperature of 40° C. ±2° C.

The cathode 28 of the R. F. sputtering system is oriented above the substrate table 22 and is connected to a R. F. potential $-V_B$ of 1,700 volts ±100 volts by well known means. The cathode 28 is enclosed in a gold plated cover 27 for shielding purposes. The power transmitted to the cathode 28 is controlled by means (not shown) which is designed to produce a power density of 3.0 watts/$cm^2$ over a wafer surface on which the quartz is to be sputtered. The thickness of the quartz deposition layers 13, 14 is controlled by the deposition time and in the present embodiment is approximately 4,000 Å thick. The properties of the quartz layers 13, 14 are monitored by its p-etch rate, which is discussed below.

A specimen 24, (FIG. 2) is positioned on the substrate table 22 or anode with intimate contact for R. F. sputtering of the quartz layers 13, 14 (FIG. 1). Accordingly, preparatory to deposition the LPE garnet film (see FIG. 1) is positioned on the substrate table with an appropriate transfer medium such as vacuum grease or gallium metal which provides a thermal contact or a heat sink for the specimen 24 to the table 22. At a substrate table temperature of 40° C. the substrate temperature is 60° C.

Also positioned in intimate thermal contact on the substrate table 22 is the sample monitoring device 26. The monitor 26 is an equivalent LPE garnet film which is utilized every time a spacer layer 13, 14 is sputtered. The p-etch rate may be determined by utilizing the monitor 26 as discussed below.

In order to determine the p-etch rate, a p-etchant (i.e., p-etch) is utilized for checking the properties of quartz and is a standard chemical etchant comprising certain fractions of hydrofluoric and nitric acids together with water. In operation therefore, after the specimen 24 and monitor 26 have been sputtered such that a desired quartz space layer has been formed, the monitor is removed from the chamber 20 and a step is etched therein with the p-etch above described. The height of the step is measured and it is then determined how much quartz has been removed in a given time. This determination constitutes the p-etch rate.

It has been discovered in accordance with this invention that there is a correlation between the p-etch rate and the bubble memory device performance such that a low p-etch rate gives improved bubble device performance, and a high p-etch rate gives poor device performance. In the present invention, a p-etch rate below 6 Angstroms (Å)/sec produced high quality bubble memory devices. In effect, the low p-etch rate indicates increased quartz or glass layer stiffness which results in decreased bubble pinning and improvement of the memory device operating margins.

It has also been discovered in this invention that the p-etch rate can be controlled by the deposition temperature and ranges from 4 Å/sec at 60° C. to 40 Å/sec at 45° C. At a 45° C. deposition temperature poor bubble devices are obtained whereas at a 60° C. deposition temperature bubble devices with good performance characteristics are obtained.

Figure 3:
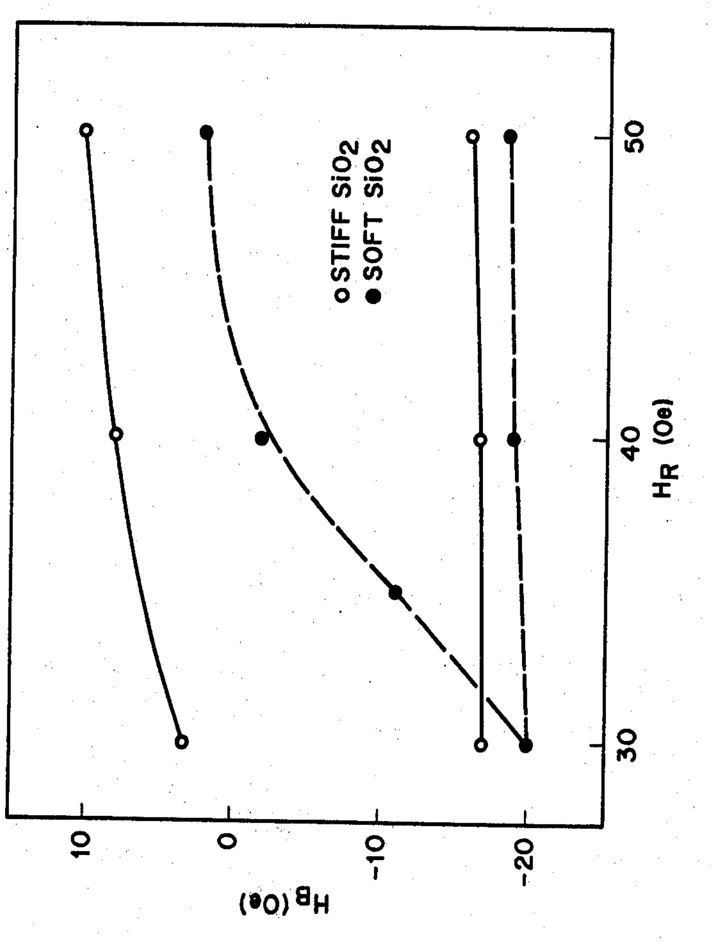
FIG. 3 represent curves which indicate the improved performance obtained in the present invention.

In an actual embodiment utilizing a 4 micron bubble layer (12 of FIG. 1) having a T-bar permalloy propagation circuit (18 of FIG. 1) wherein the bars are 2 microns wide with 1 micron gaps, a circuit periodicity of 18 microns (i.e., T element to T element) and having a dollar sign transfer gate and an 8,000 Å quartz layer (13, 14 of FIG. 1) wherein the latter has a p-etch rate of 4 Å/sec., the quasi-static margins were $H_B=26$ Oersteds (Oe) at $H_R=50$ Oe and $H_B=20$ Oe at $H_R=30$ Oe (where $H_R$ is the rotating field and $H_B$ is the bias field). With a p-etch rate of 40 Å/sec., the margins degraded to $H_B=24$ Oe at $H_R=50$ Oe and $H_B=4$ Oe at $H_R=30$ Oe. Similar behavior was found of a bubble device that used an aluminum conductor 16 as shown in FIG. 1. The improvement resulting from this invention may be visually appreciated by referring to FIG. 3 wherein the dotted curve represents bubble memory performance without using the teaching of this invention. The solid line which represents the operating curve of the bubble device in accordance with this invention indicates the greater margins which are produced.

In summary therefore, this invention has established a correlation between the properties of the glass layer used in a bubble device and its performance. In particular, a correlation has been established with respect to the p-etch rate of the glass layer and bubble device performance.

We claim:

1. A bubble memory device comprising a substrate, a magnetic bubble film formed on said substrate, a conductor and a permalloy film the improvement comprising, a. a quartz layer interposed between said conductor and said bubble film, and between said conductor and said permalloy film, said quartz layer having a stiffness characteristic obtained by a p-etch deposition rate below 6 Å/second.

2. A bubble memory device comprising:

a. a substrate;
b. a magnetic bubble film positioned on said substrate;
c. a first quartz layer positioned on said bubble film;
d. a metal conductor positioned on said quartz layer;
e. a second quartz layer positioned over said metal conductor, said first and second quartz layers having been deposited with a p-etch rate below 6 A/-second;
f. a permalloy circuit positioned upon said second quartz layer, said permalloy circuit and said metal conductor being utilized to propagation bubbles around said circuit.

3. The bubble memory in accordance with claim 2 wherein said metal conductor is formed of aluminum 2% copper.

4. The bubble memory in accordance with claim 2 wherein the combined thickness of said quartz layers is between 6,000–10,000 Å.

* * * * *